(12) United States Patent
Huff et al.

(10) Patent No.: US 6,622,558 B2
(45) Date of Patent: Sep. 23, 2003

(54) METHOD AND SENSOR FOR DETECTING STRAIN USING SHAPE MEMORY ALLOYS

(75) Inventors: Michael A. Huff, Fairfax, VA (US);
William L. Benard, Reston, VA (US);
Frederick J. Lisy, Euclid, OH (US);
Troy S. Prince, Cleveland, OH (US)

(73) Assignee: Orbital Research Inc., Cleveland, OH (US)

( * ) Notice: Subject to any disclaimer, the term of this patent is extended or adjusted under 35 U.S.C. 154(b) by 0 days.

(21) Appl. No.: 09/726,257

(22) Filed: Nov. 30, 2000

(65) Prior Publication Data

US 2002/0062692 A1 May 30, 2002

(51) Int. Cl.[7] .............................. G01B 5/30; G01B 7/16
(52) U.S. Cl. ......................... 73/432.1; 73/760; 73/768; 73/774; 73/795
(58) Field of Search .......................... 73/760, 768, 774, 73/795

(56) References Cited

U.S. PATENT DOCUMENTS

| | | | | |
|---|---|---|---|---|
| 4,518,444 A | * | 5/1985 | Albrecht et al. | 148/402 |
| 4,631,094 A | * | 12/1986 | Simpson et al. | 148/11.5 |
| 5,443,851 A | * | 8/1995 | Christie et al. | 137/72 |
| 5,687,995 A | * | 11/1997 | Mori et al. | 148/11.5 |
| 5,836,066 A | * | 11/1998 | Ingram | 219/209 |
| 6,278,084 B1 | * | 8/2001 | Maynard | 219/209 |

* cited by examiner

Primary Examiner—Hezron Williams
Assistant Examiner—André K. Jackson
(74) Attorney, Agent, or Firm—Brian Kolkowski; James Hudak

(57) ABSTRACT

A method and sensor for detecting strain using shape memory alloys is disclosed. The sensor comprises a substrate material, a flexible diaphragm provided on the substrate material and a thin film SMA material deposited on the flexible diaphragm. The thin film SMA material is capable of undergoing a phase transformation in response to a physical stimulus being applied thereto. During such a phase transformation, a change occurs in the electrical resistance of the thin film SMA material. By measuring the value of the electrical resistance of the thin film SMA material immediately before and after the thin film SMA material undergoes a phase transformation, the difference in the value of the electrical resistance can be determined and utilized to determine the magnitude of the physical stimulus that was applied to the thin film SMA material causing it to undergo a phase transformation.

13 Claims, 4 Drawing Sheets

METHOD AND SENSOR FOR DETECTING STRAIN USING SHAPE MEMORY ALLOYS

This invention was made with United States Government support under Contract DAAE07-00-C-L009 awarded by the U.S. Army Tank-Automotive and Armaments Command, the United States Government has rights in this invention pursuant thereto.

TECHNICAL FIELD

The present invention relates, in general, to shape memory alloys (SMA's) and, more particularly, to SMA materials that can be used in sensors to detect strain.

BACKGROUND ART

Shape memory alloys (SMA's) are a unique class of materials that have the ability to form two different crystalline phases, usually referred to as the martensite and austenite phases, in response to temperature and strain. SMA's are produced by combining at least two component elements into a desired shape which is then annealed. Immediately upon being annealed, the SMA material is in the austenite phase, having a specific shape (referred to hereinafter as the parent shape), and characterized by a low ductility, high Young's Modulus and high yield stress. Upon cooling, the SMA material changes into the martensite phase characterized by a high ductility, low Young's Modulus and low yield stress. In the martensite phase, the SMA material is easily deformed and can take on a different shape from its austenite, or parent, shape by the application of an external strain thereto. The SMA material will retain this different shape until it is heated to its austenite phase transformation temperature. When such heating occurs, the SMA material undergoes a phase transformation to its austenite phase and is transformed back to its parent shape. During this phase transformation the SMA material produces a very high kinetic energy output per unit volume. Because of this, SMA's can generate a relatively large force over a longer displacement as compared to other materials of the same size. Additionally, because of the electrical resistance characteristics of SMA material, joule heating can be used to raise the SMA material to its austenitic phase transformation temperature. Furthermore, the electrical resistance characteristics of SMA material results in a strain-dependent electrical resistance effect at the phase transformation temperature.

The two significant physical properties of SMA material, i.e., high recoverable strain and high actuation energy densities, have led to the development of SMA materials and devices for various applications. Bulk or thick film SMA materials are produced using traditional metal forming processes and are incorporated into many different devices ranging from orthodontia appliances to visored helmets. In these applications the bulk or thick film SMA materials take the form of wires, springs, thread fasteners, ring clamps, etc. Thin film SMA materials are produced by depositing an alloy on a substrate and have gained acceptance in micro fluidics and temperature related applications, particularly as actuators. Typically, applications utilizing bulk or thick film SMA materials exploit the one-way shape-memory property of SMA material. In these applications the bulk or thick film SMA material is strained (deformed) in the low temperature martensite phase and recovers to its parent shape upon being heated to the temperature at which the SMA material is transformed to its high temperature austenite phase. The strain-dependent electrical resistance effect of SMA material, however, has not been utilized for strain measuring devices or sensors because of the thermodynamic inefficiency of bulk or thick film SMA material. The hysteresis characteristics of bulk or thick film SMA material, which determine the phase transformation cycle period, are too slow (on the order of seconds) to be effective as a sensor. The slowness of the hysteresis characteristics of bulk or thick film SMA material is caused by the high thermal mass of this material. In contrast, due to the low thermal mass of thin film SMA material, the hysteresis characteristics of this material are quite fast (on the order of cycles/second) which makes thin film SMA material particularly suitable for certain applications, such as sensors, where the change in electrical resistance at a phase transformation of this material can be correlated to a change in strain being applied to the material. A problem, however, arises with thin film SMA material due to the difficulty in producing reliable thin film SMA materials that can repeatedly and consistently provide accurate strain measurements. Recent advances in manufacturing techniques, however, have resulted in the production of thin film SMA materials that exhibit a consistent quality suitable for use in strain measuring devices. Because of these manufacturing advances, it has become desirable to develop a sensor and method for measuring strain utilizing thin film SMA materials.

SUMMARY OF THE INVENTION

The present invention provides a method and sensor for detecting strain using shape memory alloys. The sensor comprises a substrate material, a flexible diaphragm provided on the substrate material and a sensor member deposited on the flexible diaphragm. The sensor member is formed from a thin film SMA material and is capable of undergoing a phase transformation, such as from its martensite phase to its austenite phase, in response to a physical stimulus, such as strain, being applied thereto. During such a phase transformation, the electrical resistance of the thin film SMA material undergoes a substantial change. This change in electrical resistance can be correlated to a change in strain being applied to the thin film material. In this manner, the magnitude of the strain can be determined. The present invention also provides a method for measuring a physical stimulus comprising the steps of providing a sensor comprising a thin film SMA material; measuring a physical property, such as the electrical resistance, of the thin film SMA material immediately before the material undergoes a phase transformation caused by the application of a physical stimulus thereto; applying a physical stimulus to the thin film SMA material causing the material to undergo a phase transformation; measuring a physical property, such as the electrical resistance, of the thin film SMA material immediately after the material undergoes a phase transformation; determining the difference in the value of the physical property, i.e., the electrical resistance, that occurs during the phase transformation; and utilizing the difference in the value of the physical property to determine the magnitude of the physical stimulus being applied to the thin film SMA material.

DESCRIPTION OF THE PREFERRED EMBODIMENT

The present invention relates to a method and sensor to detect strain utilizing the strain-dependent electrical resistance effect of SMA materials at their phase transformation temperature. The strain can be produced by any external stimulus, such as mechanical vibration, pressure, force, stress or other strain inducing external input.

Figure 1:
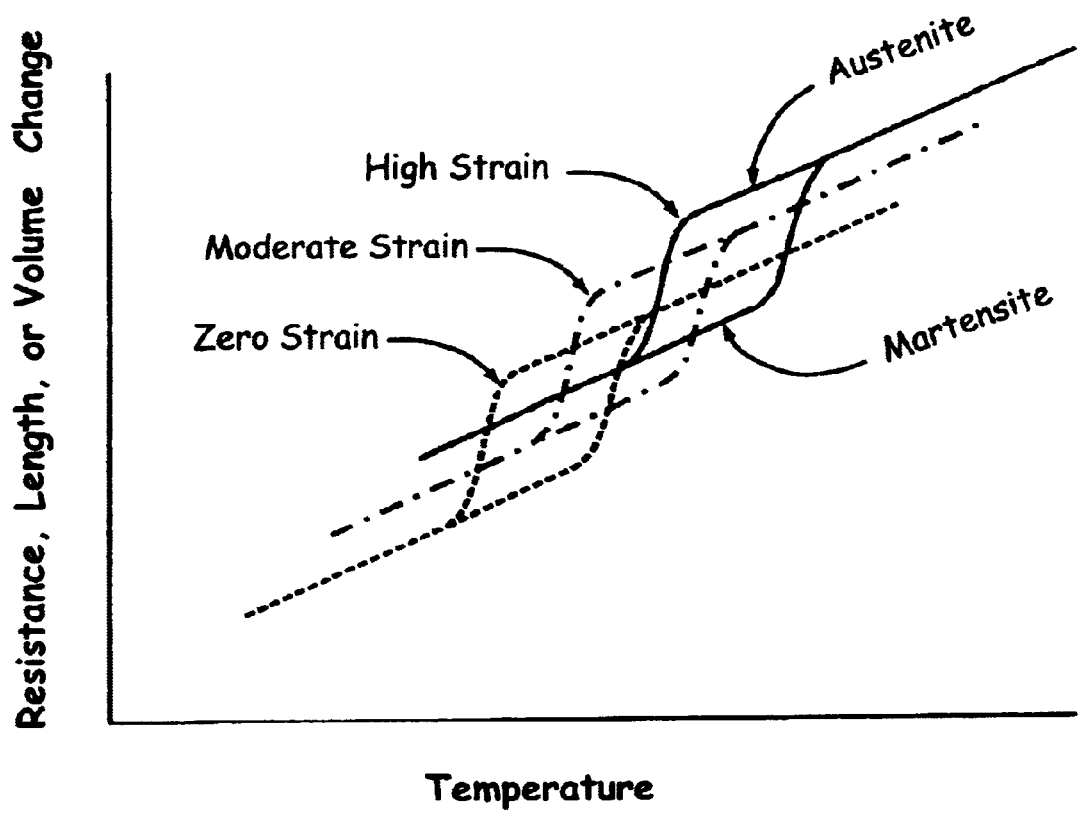
FIG. 1 is a hysteresis curve of Electrical Resistance or Length Change or Volume Change vs. Temperature for a hypothetical SMA material.

Referring now to FIG. 1, hysteresis curves of Electrical Resistance or Length Change or Volume Change vs. Temperature for a hypothetical SMA material is shown for three different levels of strain, i.e., zero strain, moderate strain, and high strain. In each instance, the bottom portion of each curve represents the material when in the martensite phase and the top portion of each curve represents the material when in the austenite phase. The portions of each curve interconnecting the bottom portion of the curve with the top portion of the curve represents a phase transformation, i.e., either from the martensite phase to the austenite phase or from the austenite phase to the martensite phase. As can be seen, each curve has a similar shape and as strain increases, the curves shift in a positive direction along the X and Y axes. Upon heating, the SMA material spontaneously transforms from the martensite phase to the austenite phase at the phase transformation temperature (the velocity of transformation is the acoustic velocity). The phase transformation temperature is a relatively narrow band of temperatures. Many of the physical properties of a SMA material, including electrical resistance, ductility, Young's Modulus, reflectivity, etc., undergo a substantial change in value during a phase transformation. The present invention relates to the large change in electrical resistance that occurs in SMA material during a phase transformation.

It has been found that when an SMA material is held at or near its phase transformation temperature, an application of strain to the material causes the material to undergo the phase transformation with a corresponding large change in the electrical resistance of the material. The amount of strain required to induce the transformation may be quite small, on the order of 0.1% or less. The figure of merit for strain gages is called the gage factor and is defined as the normalized change in electrical resistance divided by the change in strain (Gage Factor=G.F.=$((\Delta R/R)/\epsilon)$, where R is the electrical resistance; $\Delta R$ is the change in the electrical resistance; and $\epsilon$ is the strain. The gage factor for typical metal film strain gages is on the order of 2. Silicon and polycrystalline silicon piezoresistors have gage factors that vary from less than 1 to over 100 depending upon their orientation, doping level and crystalline perfection. However, this level of gage factor is quite difficult to achieve in practice. Furthermore, the high gage factor of silicon materials is lost when operated at elevated temperatures. The change in the electrical resistance of SMA material at its phase transformation temperature can, however, be on the order of 20% for a strain of 0.1%, thereby achieving a gage factor of nearly 200 ($\Delta R/R=0.2$ and $\epsilon=0.001$; therefore, 0.2/0.001=200). Also, SMA materials can have phase transformation temperatures in excess of 550° C. and, therefore, can be utilized in highly sensitive strain sensors at elevated temperature. The present invention discloses a method and a sensor utilizing SMA material to utilize this effect.

The SMA material can be, but is not limited to, binary and equal parts (atomic weight percent) of elements, binary and unequal parts of elements, or ternary or quaternary parts of various compositions of elements. These compositions may comprise elements such as a mixture of titanium and nickel (TiNi) or titanium, nickel and palladium (TiNiPd) although it can be appreciated by one having ordinary skill in the art that the present invention is not limited to SMA material comprised of the aforementioned elements. Variations in composition and alloying content affect the temperature at which a phase transformation occurs. For example, in a SMA material comprising TiNi having approximately 50% atomic weight of each element, a 1 to 2% change in the percentage of titanium to nickel shifts the phase transformation temperature from below 0° C. to over 90° C. Thus, the phase transformation temperature can be stoichiometrically tailored by utilizing binary alloys and can be extended by using ternary alloys. A SMA material comprising TiNiPd can have a phase transformation temperature as high as 550 to 600° C. depending upon the relative concentration of Pd to Ni. As Pd is substituted for Ni, the phase transformation temperature increases until the resulting compound is completely TiPd whereupon the phase transformation temperature is at its maximum. "Referring now to FIG. 2, there is shown a graph of Electrical Resistance vs. Temperature illustrating the hysteresis curves of SMA material under strain levels of 0.12% 12, 0.23% 14 and 0.35% 16. Each hysteresis curve has an austenite start point 121, 141 and 161; an austenite finish point, 122, 142 and 162; a martensite start point 123, 143 and 163; and a martensite finish point 124, 144 and 164, defining the hysteresis curves. The hysteresis curves 12, 14 and 16 further represent a family of response curves 271. As the temperature of the SMA material increases, it reaches the austenite starting point 121, 141 and 161 and the austenite phase transformation begins. The electrical resistance of the material decreases until it reaches its austenite finish point 122, 142 and 162. As the temperature of the SMA material is then decreased, the material reaches its martensite start point 123, 143 and 163 and the martensite phase transformation begins. The electrical resistance of the material increases until the material reaches its martensite finish point 124, 134 and 164. As is evident from the graph, the hysteresis curves (or family of response curves 271) shift in response to changing strain, generally moving in a positive direction with respect to both the X and Y axes in response to increasing strain. This "shifting" characteristic causes the electrical resistance of the SMA material to chanae with respect to both temperature and strain."

Figure 2:
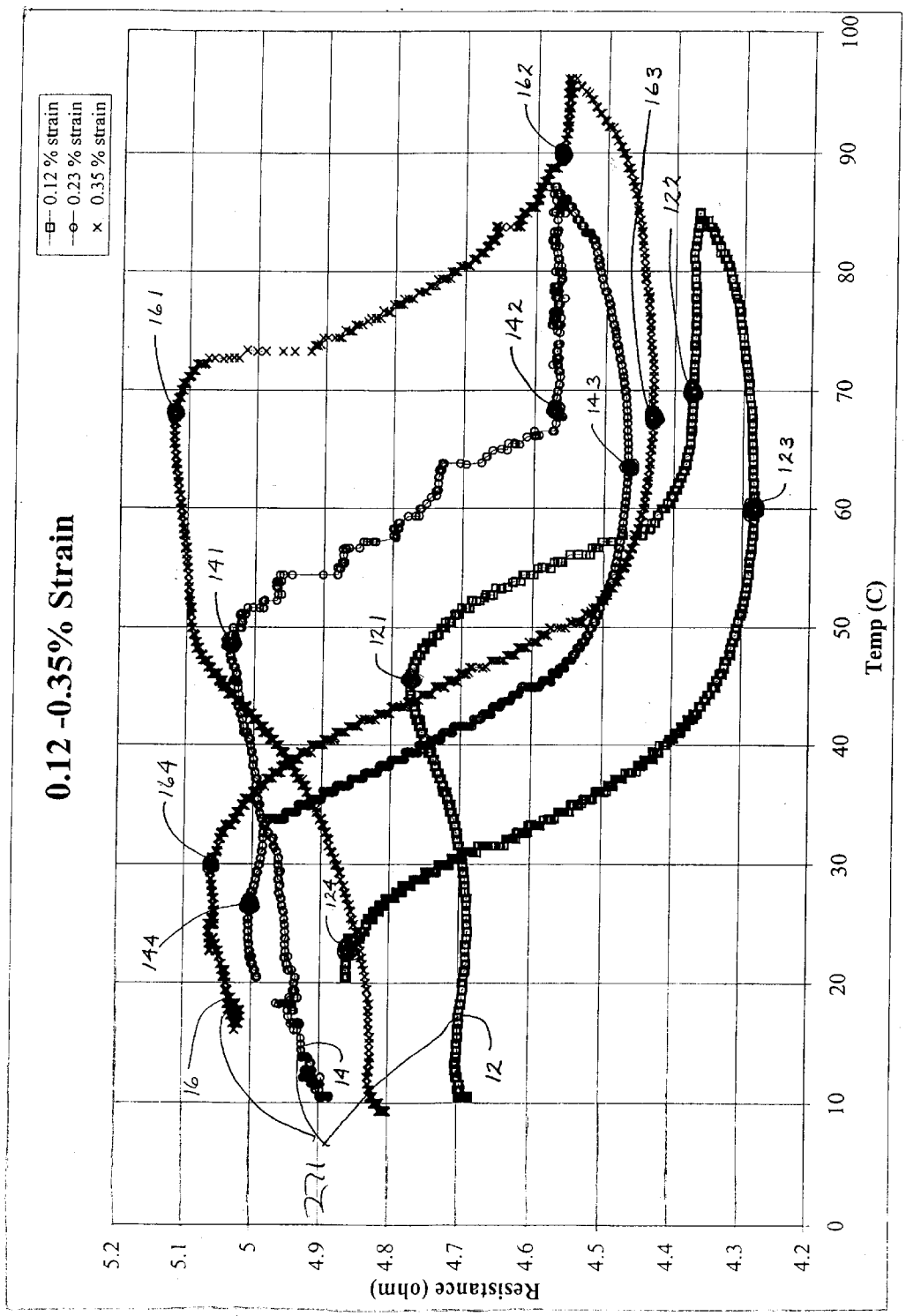
FIG. 2 is a graph of Electrical Resistance vs. Temperature and shows the hysteresis curve of a thin film SMA material under three different strain levels.

In one application of the present invention, the SMA material is heated to its austenite start point and then maintained at that temperature. As the strain increases, the electrical resistance of the SMA material at the austenite start point is measured. In FIG. 2, at approximately 45° C., this electrical resistance is 4.78 ohms for 0.12 strain 121, 5.04 ohms for 0.23% strain, and 5.12 ohms for 0.35% strain. In another application of the present invention, the SMA material is heated past its austenite phase transformation point, and then cooled to its martensite start point and maintained at that temperature. As the strain increases, the electrical resistance of the SMA material at the martensite start point is measured. In FIG. 2, at approximately 60° C., this electrical resistance is 4.28 ohms for 0.12% strain 123, 4.43 ohms for 0.23% strain and 4.46 ohms for 0.35% strain. In still another application of the present invention, the SMA material is heated and subsequently cooled through its entire hysteresis curve while maintaining strain substantially constant. The characteristics of the resulting curve are compared to other hysteresis curves in a "look-up" table to determine the value of the average strain being applied to the SMA material.

Figure 3:
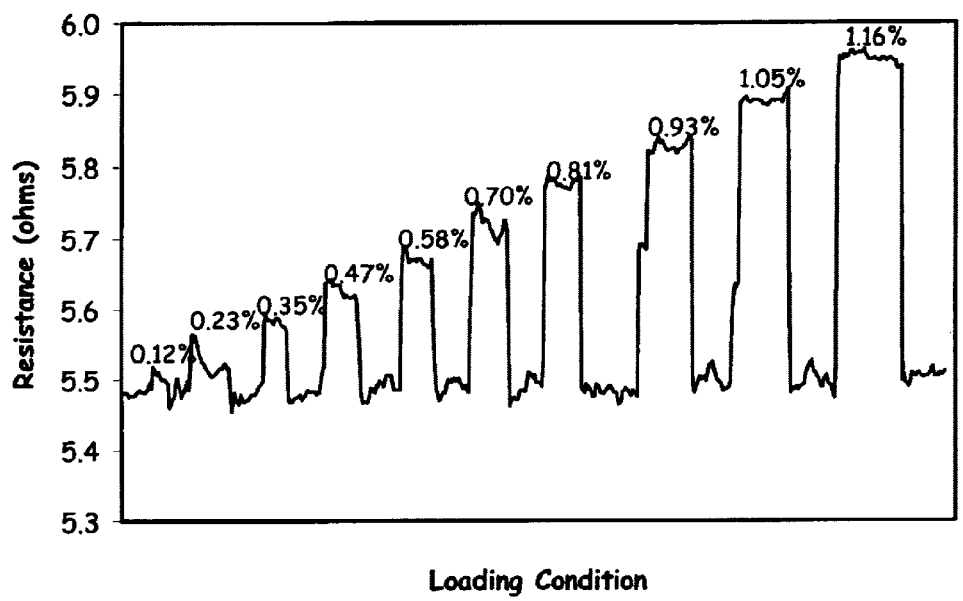
FIG. 3 is a graph of Electrical Resistance vs. Loading Condition for a thin film SMA material subjected to an increasing strain level from 0–1.2%.

Referring now to FIG. 3, there is shown a graph of Electrical Resistance vs. Loading Condition for a thin film SMA material subjected to an increasing strain level from 0–1.2%. As can be seen from this graph, the electrical resistance of the thin film SMA material increases in a substantially linear manner, from 5.49 ohms to 5.95 ohms, with an increase in the level of strain from 0.12% to 1.16%. Also, it can be seen that the electrical resistance of the material returns to nearly the same value (approximately 5.49 ohms) when the strain is removed. The loading condition corresponds to pressure or force applied to the thin film SMA material which produces the strain thereon.

Figure 4:
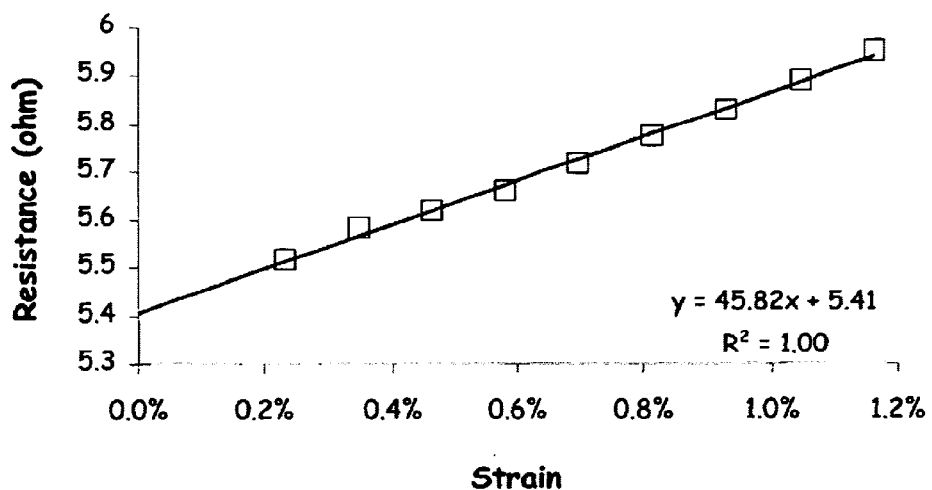
FIG. 4 is a Best Fit Line Graph of Electrical Resistance vs. Strain showing the linear response therebetween for a thin film SMA material.

FIG. 4 is a Best Fit Line Graph of Electrical Resistance vs. Strain. This graph illustrates the substantially linear response of the thin film SMA material to the application of strain applied thereto. The Best Fit Line has an $R^2$ value of 1.00 and is defined by the equation $y=45.82x+5.41$.

Figure 5:
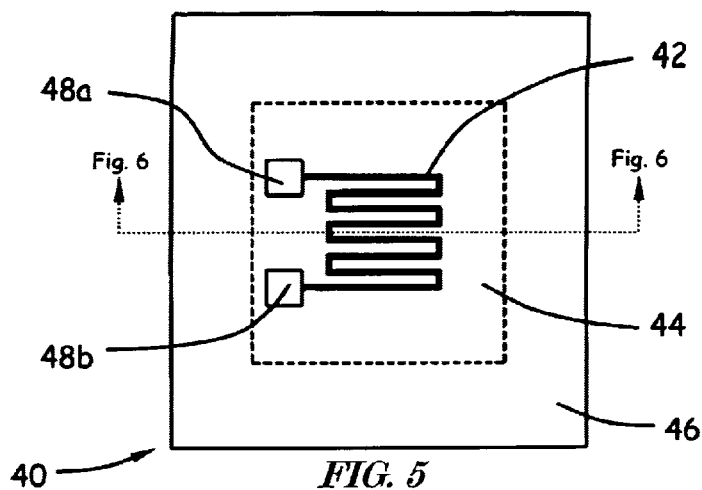
FIG. 5 is a top plan view of a thin film SMA material strain sensor.
Figure 6:
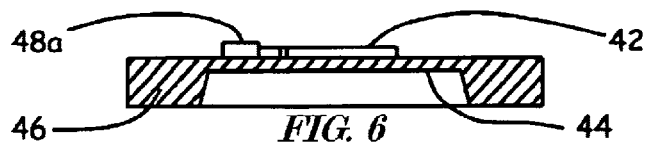
FIG. 6 is a cross-sectional view of a thin film SMA material strain sensor taken across section-indicating lines 6—6 of FIG. 5.
Figure 8:
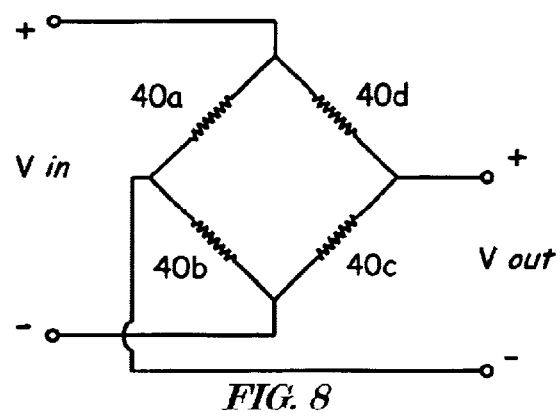
FIG. 8 is an electrical schematic of four thin film SMA material strain sensors in a Wheatstone Bridge configuration.

Referring now to FIG. 5, there is shown a top plan view of a SMA material strain sensor 40. A sensor element 42 formed from thin film TiNi material is deposited over a flexible diaphragm 44 on a substrate 46. Typically, the flexible diaphragm 44 has an area of approximately 1 mm² whereas the substrate 46 has an area of approximately 1 cm². Sensor terminals 48a and 48b provide electrical connection points for leads (not shown) for attachment of the sensor element 42 to external measuring devices or controllers. When a strain is applied to the flexible diaphragm 44, the sensor element 42 flexes. Since the sensor element 42 is at the martensite/austenite phase transformation temperature, the sensor element 42 readily flexes and exhibits substantially linear electrical resistance vs. strain characteristics. The electrical resistance of the sensor element 42 increases as the strain applied thereto increases. The electrical resistance of the sensor element 42 can be transmitted through the sensor terminals 48a and 48b to external measuring devices or controllers. For example, a change in the electrical resistance of the sensor element 42 can be transformed into a change in the voltage drop across the same. In view of the foregoing, the SMA strain sensor 40 can be utilized in a control circuit where a change in pressure or force is being monitored. An example of such a circuit is illustrated in FIG. 8, which is an electrical schematic of four SMA strain sensors 40a, 40b, 40c, and 40d connected in a basic Wheatstone Bridge circuit. Because of their electrical resistive characteristics, the SMA strain sensors 40a, 40b, 40c, and 40d can be utilized in any Wheatstone Bridge circuit application in which the change in output voltage corresponds to change in strain.

Figure 7:
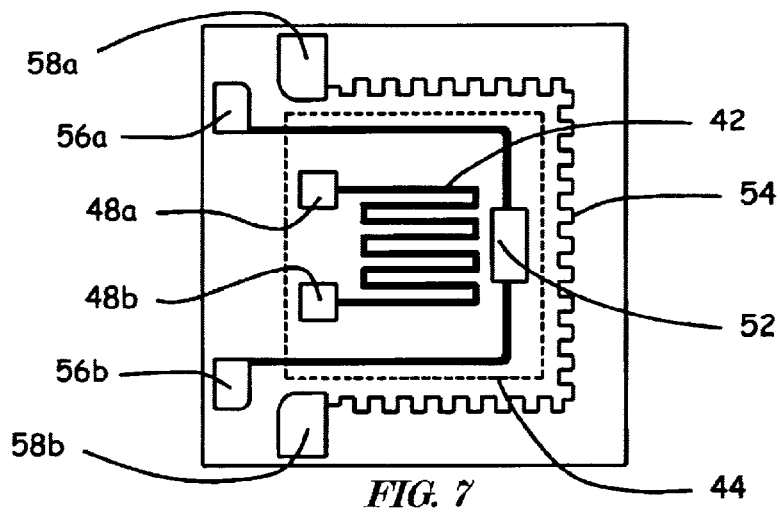
FIG. 7 is a top plan view of a thin film SMA material strain sensor including a temperature measuring element and a heating element.

Referring now to FIG. 7, there is shown a top plan of the SMA material strain sensor 40 illustrated in FIG. 4 but further including a temperature measuring element 52 and a heating element 54. The temperature measuring element 52 and heating element 54 are used to ensure that the temperature of the sensor element 42 is maintained at the phase transformation temperature. The temperature measuring element 52 can be any suitable temperature measuring device whereas the heating element 54 can be a resistance heater integrated into the sensor element 42, or can be separate therefrom. The temperature measuring element 52 is located on the flexible diaphragm 44 to provide an accurate measurement of the temperature of the sensor element 42. Typically, the flexible diaphragm 44 is a thin diaphragm resulting in low power consumption and fast thermal response. Temperature terminals 56a and 56b provide a connection between the temperature measuring element 52 and external temperature measuring devices. The heating element 54 is located on the diaphragm 44 to provide a substantially uniform temperature to the sensor element 42. The heating element 54 is also capable of varying the temperature of the sensor element 42 through the phase transformation process. Heater terminals 58a and 58b provide connection between the heater element 54 and an external power source when the environment is cooler than the phase transformation temperature. In this manner, the sensor 40 can be operated above ambient temperature and the sensor operation can be tailored for optimum sensitivity.

Certain modifications and improvements will occur to those skilled in the art upon reading the foregoing. It is understood that all such modifications and improvements have been deleted herein for the sake of conciseness and readability, but are properly within the scope of the following claims.

What is claimed is:

1. A method of measuring a physical stimulus comprising the steps of:
   a. providing a sensor comprising a material capable of undergoing a phase transformation from a first phase to a second phase in response to the application of a physical stimulus thereto;
   b. measuring a physical property of said material before said material undergoes a phase transformation;
   c. applying a physical stimulus to said material causing said material to undergo said phase transformation;
   d. measuring said physical property of said material after said material undergoes said phase transformation;
   e. determining the difference in the value of said physical property that occurs during said phase transformation; and
   f. utilizing said difference in said value of said physical property to determine the magnitude of said physical stimulus.

2. The method of measuring a physical stimulus as defined in claim 1 wherein said first phase is the martensite phase of said material.

3. The method of measuring a physical stimulus as defined in claim 2 wherein said second phase is the austenite phase of said material.

4. The method of measuring a physical stimulus as defined in claim 3 wherein said material comprises substantially equal parts, by atomic weight percentage, of titanium and nickel.

5. The method of measuring a physical stimulus as defined in claim 3 wherein said material comprises substantially unequal parts, by atomic percentage, of titanium and nickel.

6. The method of measuring a physical stimulus as defined in claim 3 wherein said material comprises titanium, nickel, and at least one other metal.

7. The method of measuring a physical stimulus as defined in claim 3 further including the step of controlling the temperature of said material during steps b, c, and d thereof.

8. A method of measuring a physical stimulus comprising the steps of:
   a. providing a sensor comprising a material having an electrical resistance and capable of undergoing a phase transformation from a first phase to a second phase in response to the application of a physical stimulus thereto;
   b. measuring said electrical resistance of said material before said material undergoes a phase transformation;
   c. applying a physical stimulus to said material causing said material to undergo said phase transformation;
   d. measuring said electrical resistance of said material after said material undergoes said phase transformation;
   e. determining the difference in the value of said physical property that occurs during said phase transformation; and
   f. utilizing said difference in said value of said physical property to determine the magnitude of said physical stimulus.

9. A method of measuring a physical stimulus comprising the steps of:
   a. providing a sensor comprising a material capable of undergoing a phase transformation from a first phase to a second phase in response to varying the temperature of said material;
   b. applying a physical stimulus to said material;
   c. increasing the temperature of said material causing said material to undergo a phase transformation from said first phase to said second phase producing a first portion of a response curve;
   d. decreasing the temperature of said material causing said material to undergo a phase transformation from said second phase to said first phase producing a second portion of said response curve;
   e. comparing said first and second portions of said response curve with a family of response curves; and
   f. determining the value of said physical stimulus from said comparison of said first and second portions of said response curves.

10. The method of determining the value of a physical stimulus as defined in claim 9 wherein said physical stimulus is strain.

11. A sensor for measuring a physical stimulus applied comprising a substrate material, a flexible diaphragm provided on said substrate material, and a sensor member deposited on said flexible diaphragm, said sensor member being capable of undergoing a phase transformation in response to a stimulus being applied thereto.

12. The sensor as defined in claim 11 wherein the application of a physical stimulus to said flexible diaphragm causes said flexible diaphragm and said sensor member to deflect causing said sensor member to undergo a phase transformation.

13. The sensor as defined in claim 11 further including means for controlling the temperature of said sensor member.

* * * * *